(12) United States Patent
Nakajima

(10) Patent No.: US 6,798,845 B1
(45) Date of Patent: Sep. 28, 2004

(54) TRANSMITTER FOR MOBILE TERMINAL WITH CARRIER LEAK SUPPRESSING CIRCUIT

(75) Inventor: Toshikazu Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 864 days.

(21) Appl. No.: 09/630,394

(22) Filed: Aug. 1, 2000

(30) Foreign Application Priority Data

Aug. 4, 1999 (JP) ......................................... 11-221012

(51) Int. Cl.[7] .............................................. H04L 25/03
(52) U.S. Cl. ..................... 375/297; 375/285; 455/127.2
(58) Field of Search ................................. 375/140, 284, 375/285, 295, 296, 297, 130, 141, 146; 455/63, 126, 127.1, 127.2, 127.3; 332/123, 124, 159, 160, 162

(56) References Cited

U.S. PATENT DOCUMENTS

| | | | | |
|---|---|---|---|---|
| 5,396,196 A | * | 3/1995 | Blodgett | 332/103 |
| 5,410,729 A | * | 4/1995 | Kumagai et al. | 455/12.1 |
| 5,574,994 A | * | 11/1996 | Huang et al. | 455/126 |
| 5,847,619 A | * | 12/1998 | Kirisawa | 332/103 |
| 6,396,879 B1 | * | 5/2002 | Yoshimura et al. | 375/297 |

FOREIGN PATENT DOCUMENTS

| | | | |
|---|---|---|---|
| JP | 5-59937 | 8/1993 | |
| JP | 08204772 A | * 8/1996 | .......... H04L/27/20 |
| JP | 10-117153 | 5/1998 | |
| JP | 10-327124 | 12/1998 | |

* cited by examiner

*Primary Examiner*—Chieh M. Fan
(74) *Attorney, Agent, or Firm*—Sughrue Mion, PLLC

(57) ABSTRACT

A transmitter suitable for a CDMA mobile terminal is provided which realizes a circuit with a small size and low consumption power which suppresses the effect of carrier leak in the state where a transmission output is controlled at a low level. A carrier control circuit comprises a reference voltage generator, a comparator, and a controller. The comparator determines whether the level of a control signal is higher or lower than a reference voltage. The controller controls the gain of a local variable amplifier such that a distortion characteristic of a transmission output is optimal when the control signal is higher than the reference voltage, and controls the gain of the local variable amplifier such that the effect of carrier leak on the transmission output is suppressed when the control signal is lower than the reference voltage based on the determination result of the comparator.

11 Claims, 5 Drawing Sheets

TRANSMITTER FOR MOBILE TERMINAL WITH CARRIER LEAK SUPPRESSING CIRCUIT

BACKGROUND OF THE INVENTION

1. Field of the Invention

The present invention relates to a transmitter suitable for a CDMA (Code Division Multiple Access) mobile terminal.

2. Description of the Related Art

In a mobile communication with a spread spectrum scheme (hereinafter referred to as a CDMA scheme), a plurality of mobile terminals share the same frequency band with one another and each of the mobile terminals spreads transmission data with a spreading code and transmits the spread data to a base station. The mobile terminals are respectively assigned different spreading codes each having orthogonality. The base station can extract data received from a particular mobile terminal by performing despread with the same spreading code as that used by the mobile station for spread. A particular mobile terminal considers all the transmission power of the other mobile stations which share the same frequency band with the mobile terminal as noise.

For this reason, in the mobile communication with the CDMA scheme, control (hereinafter referred to as transmission power control) for suppressing the transmission power of all mobile terminals to a minimum level required for ensuring a predetermined error rate is performed for reducing a noise level to other mobile terminals to provide as many mobile terminals as possible which can share the same frequency band with one another, thereby achieving effective utilization of radio frequencies and a reduction in equipment cost of a system or the like. Therefore, exact transmission power control is required for a mobile communication system with the CDMA scheme.

In addition, in the CDMA scheme, since a signal with a spread wide frequency bandwidth is transmitted, a transmitter with a wide dynamic range is required in the transmission power control. In particular, a transmitter of a mobile terminal needs to realize a small size, light weight, and low power consumption.

In the transmitter, however, a phenomenon called carrier leak occurs in which a carrier for use in modulation directly appears on an output from a modulator. When an output from a transmitter is high, the effect of the carrier leak causes no problem since the level of the carrier leak is negligible as compared with the level of an output signal from the modulator. However, when the output from the transmitter is low, the effect of the carrier leak is not negligible.

Conventionally, circuits for suppressing the carrier leak include a circuit as described in Japanese Patent Laid-open Publication No. 8-204772 in which the phase of a carrier signal is reversed by 180 degrees and combined with an output from a modulator, or a feedback circuit as described in Japanese Patent No. 2852294 in which an output level from a modulator is monitored and a carrier output is suppressed when the level is low.

In the circuit described in Japanese Patent Laid-open Publication No. 8-204772, it is necessary to adjust the phase and level of a signal to be combined while a spectrum analyzer makes observations, which renders the circuit unsuitable for use in a mass-produced mobile terminal. In the circuit described in Japanese Patent No. 2852294, since an output from a modulator needs to be split with a directional coupler toward a detection circuit, the circuit is not optimal for a mobile terminal which requires a small size, light weight, and low consumption power in terms of attenuation due to loss in the directional coupler and the circuit scale. In addition, since the output level of the modulator is monitored to control the carrier output, the control of the carrier may be delayed if transmission power is suddenly changed.

SUMMARY OF THE INVENTION

It is an object of the present invention to provide a transmitter for a mobile terminal of small size, light weight, and low consumption power including a carrier leak suppressing circuit.

It is another object of the present invention to provide a transmitter for a mobile communication terminal in which characteristics of a carrier leak suppressing circuit can be optimally changed after the start of operation.

According to one aspect of the present invention, the transmitter has a carrier control circuit including reference voltage generating means, a comparator, and a controller as a carrier leak suppressing circuit.

The comparator compares the level of a powder control signal with a reference voltage. The controller controls the gain of a local variable gain amplifier in a carrier generating circuit such that a distortion characteristic of a transmitter output is optimal when the power control signal is higher than the reference voltage and the effect of carrier leak on the transmitter output is suppressed when the power control signal is lower than the reference voltage based on the comparison result of the comparator.

Therefore, the use of the carrier control circuit in a transmitter of a mobile terminal which exerts a changeable output level with transmission power control can provide a transmitter output such that distortion is optimal when the transmitter output is high, or the effect of carrier leak is suppressed when the transmitter output is low, thereby allowing much channel capacity to be ensured for a mobile communication system. In addition, the use of the control signal for the control of a carrier eliminates the need for splitting and detecting the output from a modulator to enable realization of a small size and low consumption power. Moreover, since the carrier control and transmission power control are simultaneously performed using the control signal, the carrier control is not delayed with respect to the transmission power control, resulting in the suppression of carrier leak with appropriate timing.

According to an embodiment of the present invention, the reference voltage generating means generates a reference voltage equal to a level of a control signal corresponding to transmission power equal to the level of carrier leak.

Therefore, the level of carrier leak is not higher than the output from the modulator.

According to another embodiment of the present invention, the comparator has a hysteresis characteristic in the determination of whether the level of the power control signal is higher or lower than the reference voltage.

Therefore, instability of control can be prevented when the voltage level of the power control signal is increased and reduced near the reference voltage, thereby obtaining a stable output from the modulator.

According to another embodiment of the present invention, the reference voltage is changeable. This facilitates initial settings, adjustment for adapting the reference value to variations in characteristics of circuit parts or the like, and enables changes in a reference code value or a hysteresis width after the start of operation. Thus, manufacturing processes can be reduced and optimization after the start of operation can be performed.

According to another aspect of the present invention, the carrier control circuit includes a reference value register, a comparator, and a controller.

The comparator determines whether a control code is higher or lower than a predetermined reference code which is the output from the reference value register. The controller controls the gain of the local variable amplifier such that a distortion characteristic of a transmitter output is optimal when the control code is higher than the reference code, and controls the gain of the local variable amplifier such that the effect of carrier leak on the transmitter output is suppressed when the control code is lower than the reference.

Therefore, the use of the carrier control circuit of this configuration in a transmitter of a mobile terminal which exerts a changeable output level with transmission power control can provide a transmitter output such that distortion is optimal when the transmitter output is high, or the effect of carrier leak is suppressed when the transmitter output is low, thereby allowing much channel capacity to be ensured for a mobile communication system. In addition, the use of the control code for the control of a carrier eliminates the need for splitting and detecting the output from the modulator to enable realization of a small size and low consumption power. Moreover, since the carrier control and transmission power control are simultaneously performed using the control code, the carrier control is not delayed with respect to the transmission power control, resulting in the suppression of carrier leak with appropriate timing.

According to an embodiment of the present invention, the reference value register outputs a reference code equal to a control code corresponding to transmission power equal to the level of carrier leak. Thus, the level of carrier leak is not higher than the output from the modulator.

According to another embodiment of the present invention, the comparator has a hysteresis characteristic in the determination of whether the value of the power control code is higher or lower than the reference code. Therefore, instability of control can be prevented when the value of the control code is slightly increased and reduced repeatedly near the reference code, thereby obtaining a stable output from the modulator.

According to another embodiment of the present invention, the reference code generated by the reference value register is changeable. This facilitates initial settings, adjustment for adapting the reference value to variations in characteristics of circuit parts or the like, and enables changes in a reference code value or a hysteresis width after the start of operation. Thus, manufacturing steps can be reduced and optimization after the start of operation can be performed.

The above and other objects, features, and advantages of the present invention will become apparent from the following description with reference to the accompanying drawings which illustrate examples of the present invention.

DESCRIPTION OF THE PREFERRED EMBODIMENTS

First Embodiment

Figure 1:
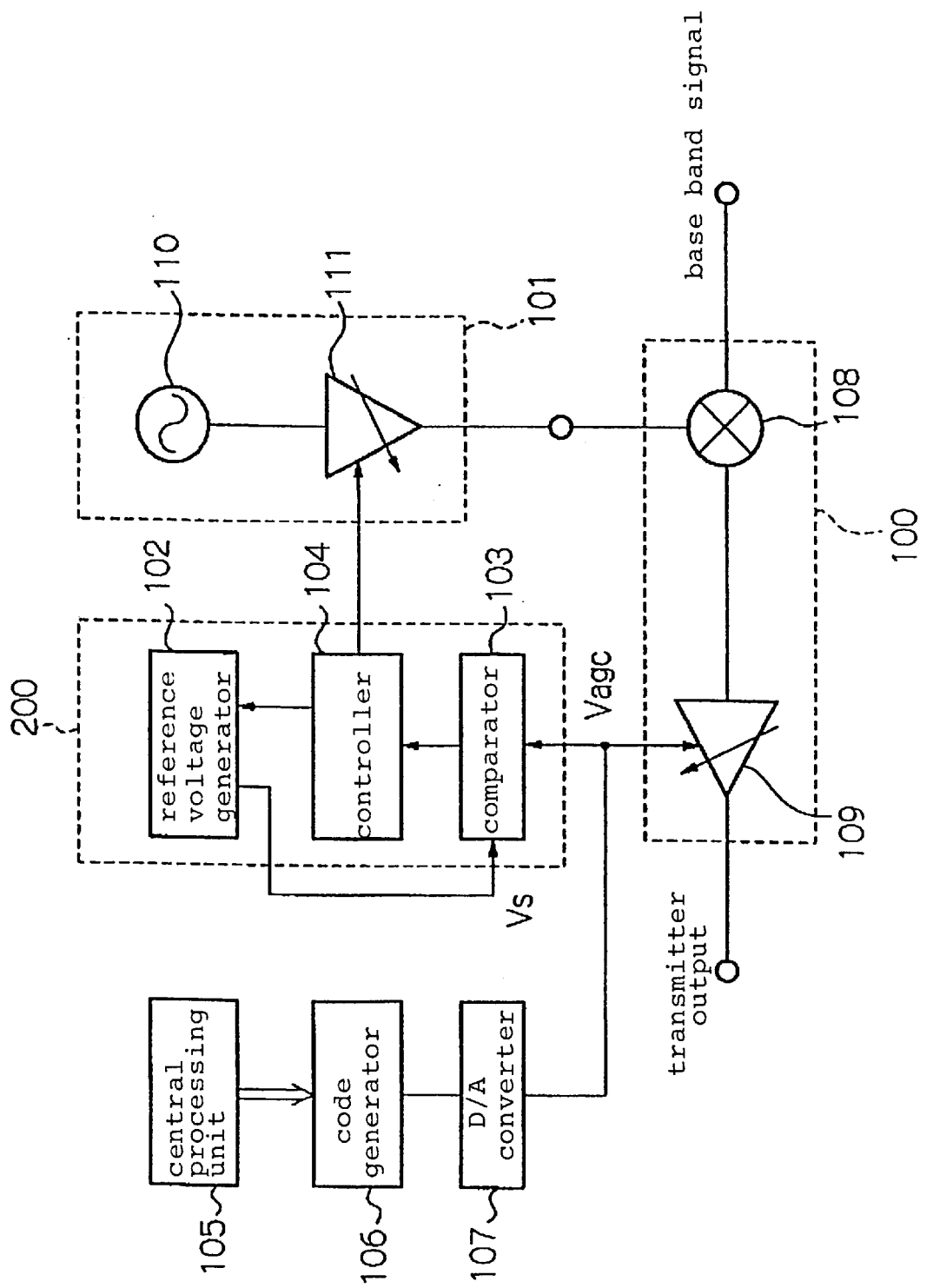
FIG. 1 is a block diagram showing a transmitter according to a first embodiment of the present invention.

Referring now to FIG. 1, there is shown a transmitter according to a first embodiment of the present invention comprising modulating unit 100, carrier generating circuit 101, carrier control circuit 200, central processing unit 105, code generating unit 106, and D/A converter 107.

Modulating unit 100 comprises multiplier 108 for multiplying a baseband signal by a carrier signal, and AGC variable amplifier 109 for variably amplifying the output signal from multiplier 108 based on a voltage level of a power control signal Vagc for controlling a transmission power level of a mobile terminal according to a direction from a base station.

Carrier generating circuit 101 comprises local oscillator 110 for oscillating at a carrier frequency, and local variable amplifier 111 for amplifying the output signal from local oscillator 110 to a predetermined level. The gain of local variable amplifier 111 has two levels of X and Y. The gain X is a gain at which the distortion of the output signal of the transmitter is optimal, while the gain Y is a gain used when carrier leak is suppressed. The gain X and the gain Y has the relationship X>Y.

Carrier control circuit 200 comprises reference voltage generating section 102 for producing a reference voltage signal Vs equal to the level of power control signal Vagc corresponding to transmission power equal to the level of the carrier leak, comparator 103 for comparing the signal voltage levels of two inputs to output the comparison result, and controller 104 for controlling the gain of the carrier amplification in carrier generating circuit 101 based on the comparison result of comparator 103.

Comparator 103 compares the voltage levels of the reference voltage signal Vs with the power control signal Vagc, and notifies controller 104 that Vagc is higher than Vs or Vagc is lower than Vs.

Controller 104 has a function for controlling the gain of local variable amplifier 111 at two levels, X and Y, in accordance with the comparison result of comparator 103. Controller 104 performs control such that the gain X is set in the case of the voltage levels being Vagc>Vs, while the gain Y is set in the case of the voltage levels being Vagc<Vs.

Central processing unit 105 analyzes the direction from the base station and notifies code generating unit 106 of control information for performing transmission power control.

Code generating unit 106 outputs a power control signal in the form of a control code to D/A converter 107 in accordance with the notification from central processing unit 105. D/A converter unit 107 digital/analog converts the control code output from code generating unit 106 to produce and output the power control signal Vagc.

Figure 2:
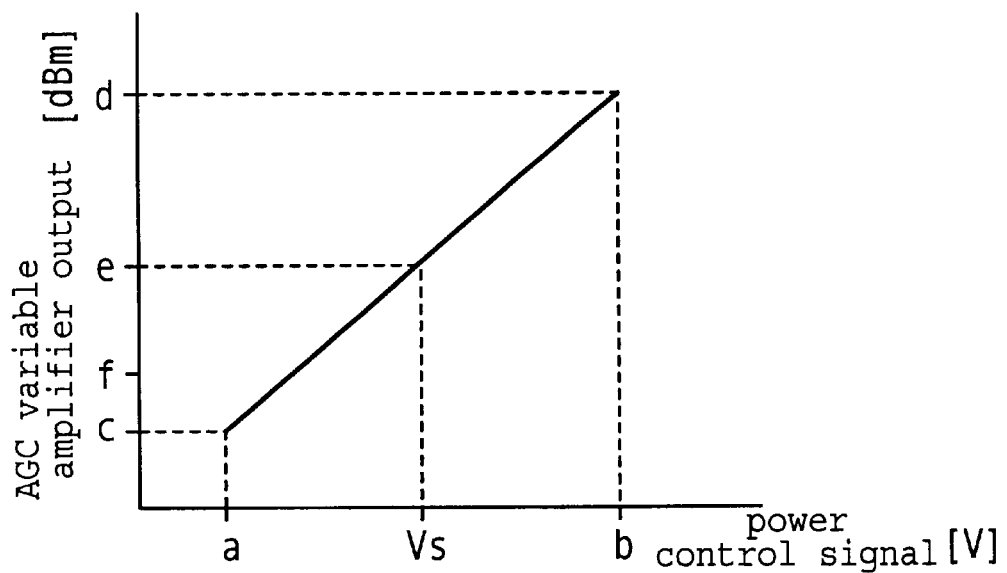
FIG. 2 is a graph showing a relationship between a power control signal and transmission power of the transmitter shown in FIG. 1.

Description is now made for the selection of the Vs voltage level value with reference to FIG. 2. Assuming that the voltage level of the power control signal Vagc can take on a value from a to b, the output from AGC variable amplifier 109 can take on a value from c to d. Assume that the level of carrier leak is e when the gain of local variable amplifier 111 is X, while the level of carrier leak is f when the gain is Y. The voltage level at the intersection of the output from AGC variable amplifier 109 and e is selected as the Vs.

Next, the operation of carrier control circuit 200 of the embodiment is described with reference to FIG. 3 and FIG. 4.

Figure 3:
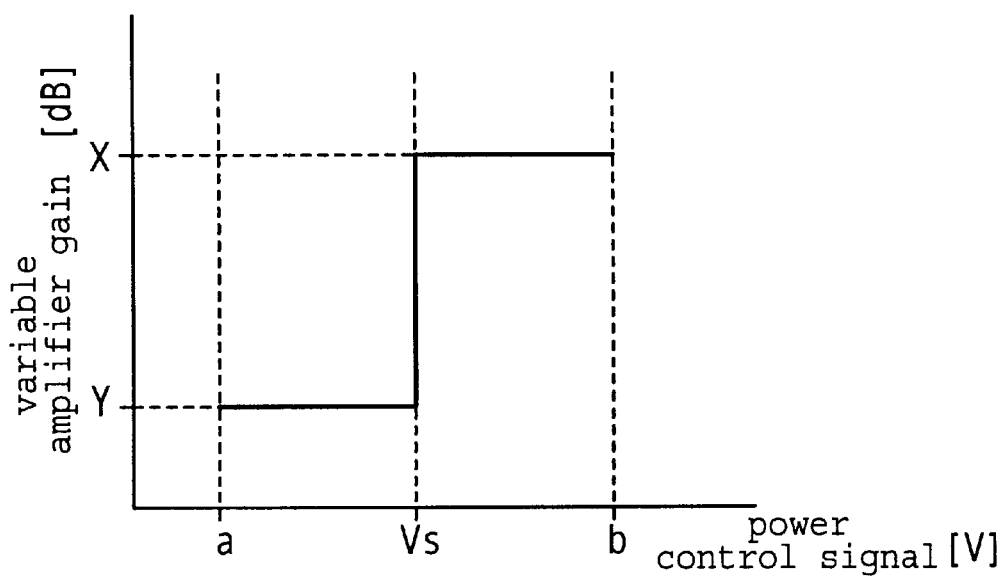
FIG. 3 is a graph showing a relationship between the power control signal and the gain of a local variable gain amplifier of the transmitter shown in FIG. 1.

As shown in FIG. 3, when the voltage level of the power control signal Vagc is higher than the Vs, controller 104 controls local variable amplifier 111, in response to the notification from comparator 103 that Vagc>Vs, such that the gain X is set for optimal distortion in the transmitter output. At this point, since the output signal of the transmitter output from AGC variable amplifier 109 is sufficiently high, carrier leak is at a negligible level. On the other hand, when the Vagc is lower than the Vs, the effect of carrier leak needs to be suppressed. Thus, controller 104, in response to the notification from comparator 103 that Vagc<Vs, controls local variable amplifier 111 such that the gain Y is set.

Therefore, the use of the carrier control circuit of the present invention in the transmitter of the mobile terminal which exerts a changeable output level with transmission power control can provide a transmitter output such that distortion is optimal when the transmitter output is high, or the effect of carrier leak is suppressed when the transmitter output is low, thereby allowing much channel capacity to be ensured for a mobile communication system. In addition, the use of the power control signal Vagc for the carrier control eliminates the need for splitting and detecting the output from AGC variable amplifier 109 to enable realization of a small size and low consumption power. Moreover, since the carrier control and transmission power control are simultaneously performed using the power control signal Vagc, the carrier control is not delayed with respect to the transmission power control, resulting in the suppression of carrier leak with appropriate timing.

Figure 4:
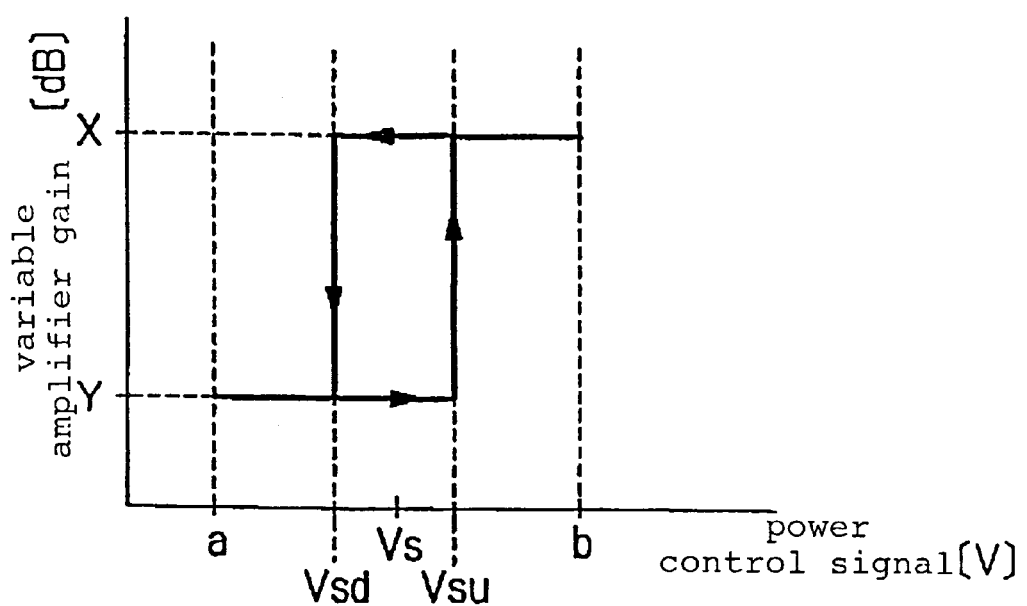
FIG. 4 is a graph showing a relationship between the power control signal in a carrier control circuit and the gain of the local variable amplifier when hysteresis is provided in gain control of the local variable gain amplifier.

As shown in FIG. 4, a hysteresis characteristic may be provided in the determination of whether the voltage level of the power control signal Vagc is higher or lower than the reference voltage signal Vs. In this case, reference voltage generating section 102 generates two reference values of a first reference voltage signal Vsu and a second reference voltage signal Vsd (Vsu>Vs>Vsd>0) in consideration of the hysteresis characteristic, and supplies the two values to comparator 103. Comparator 103 notifies controller 104 of the determination of whether the Vagc is higher or lower than the Vsu and the determination of whether the Vagc is higher or lower than the Vsd. Controller 104 may be configured to change the gain from X to Y when the Vagc is lower than the Vsd, and change the gain from Y to X when the Vagc is higher than the Vsu.

With this configuration, instability of control can be prevented when the Vagc voltage level is repeatedly increased and reduced slightly near the Vs voltage level.

Additionally, the voltage level of the reference voltage signal Vs may be changed. This facilitates initial settings and adjustment to enable manufacturing processes to be reduced.

Second Embodiment

Figure 5:
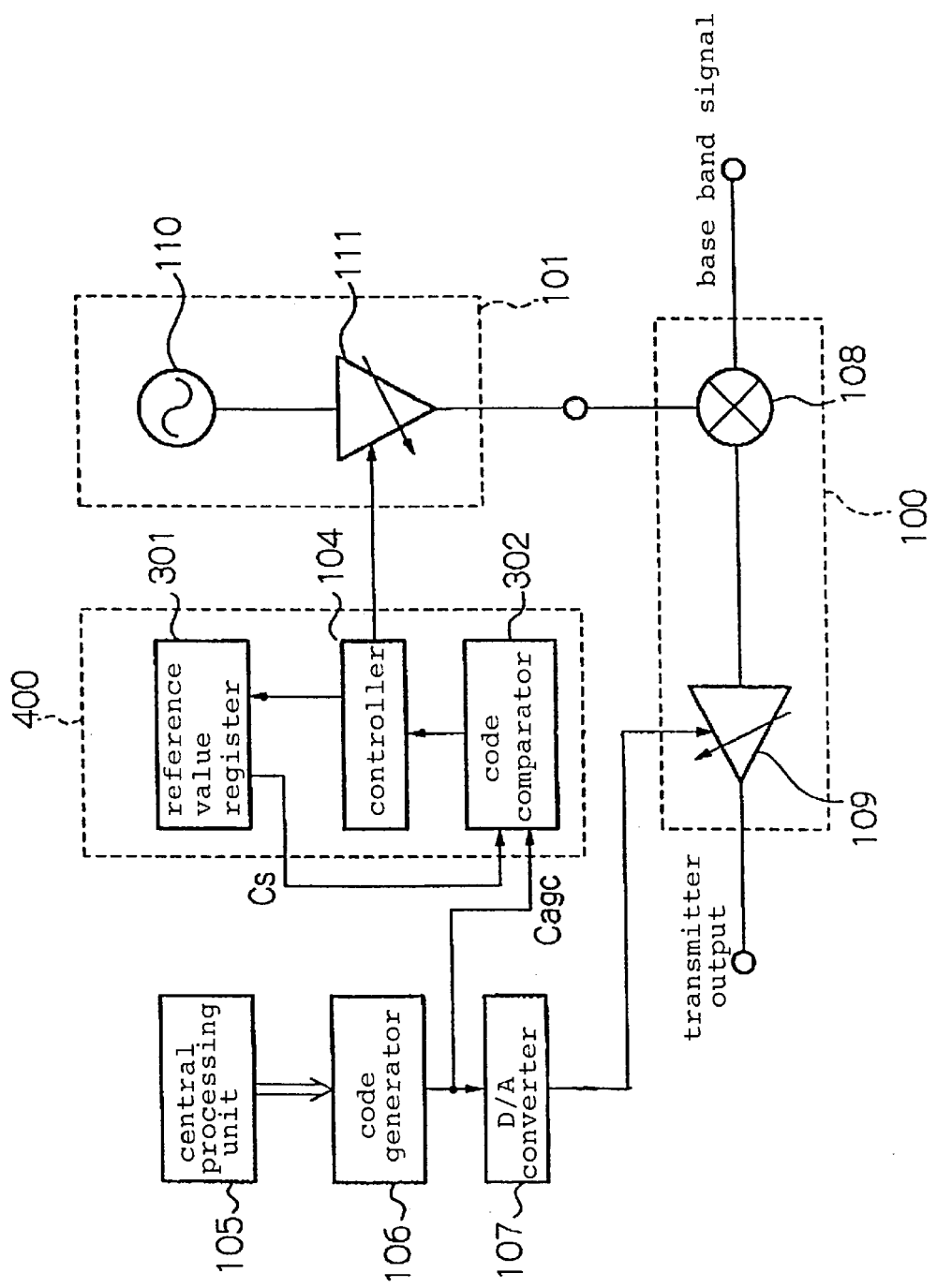
FIG. 5 is a block diagram showing a transmitter according to a second embodiment of the present invention.

Referring to FIG. 5, there is shown a block diagram of a transmitter according to a second embodiment of the present invention.

The transmitter of the embodiment differs from the first embodiment in the configuration of the carrier control circuit. Since the remaining configurations are similar to those of the first embodiment, the description thereof is omitted.

Carrier control circuit 400 of the embodiment comprises reference value register 301, code comparator 302, and controller 104.

Reference value register 301 stores and outputs a reference code Cs corresponding to the reference voltage signal Vs.

Code comparator 301 functions to compare the reference code Cs with a code Cagc which is a power control signal before digital/analog conversion, and notify control section 104 whether Cagc>Cs or Cagc<Cs.

Controller 104 controls the gain of local variable amplifier 111 at two levels of X and Y in accordance with the comparison result of code comparator 302. Controller 104 performs control such that the gain X is set in the case of the code values being Cagc>Cs, while the gain Y is set in the case of the code values being Cagc<Cs.

The operation and effects the second embodiment are similar to those of the first embodiment.

Third Embodiment

Figure 6:
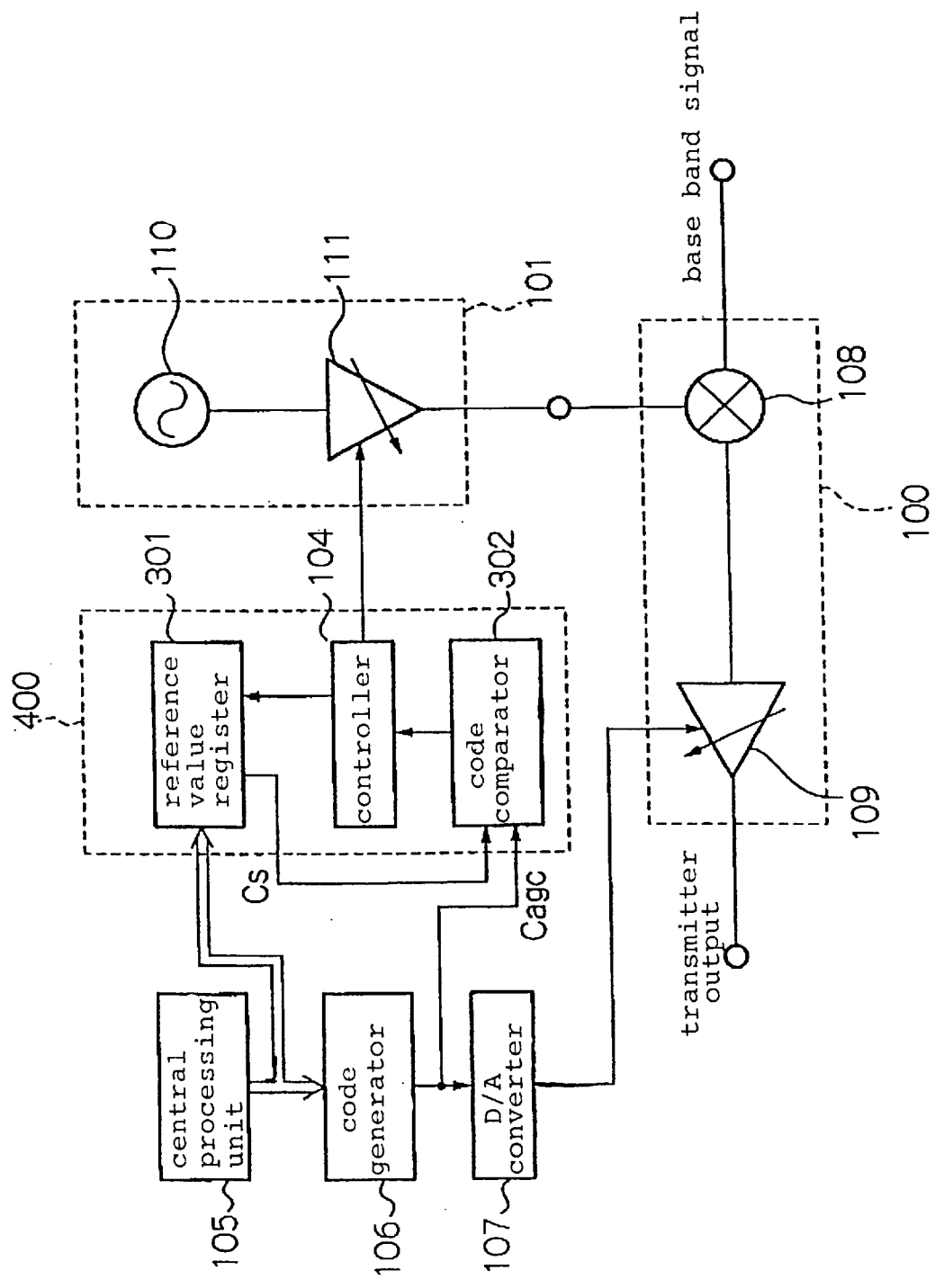
FIG. 6 is a block diagram showing a transmitter according to a third embodiment of the present invention.

As shown in FIG. 6, in a third embodiment, a reference code stored in reference value register 301 is set from central processing unit 105 and changed. This facilitates initial settings and adjustment to enable manufacturing steps to be reduced. In addition, changes after the start of operation are readily performed to allow optimization in accordance with operational states.

While preferred embodiments of the present invention have been described using specific terms, such description is for illustrative purposes only, and it is to be understood that changes and variations may be made without departing from the spirit or scope of the following claims.

What is claimed is:

1. A transmitter wherein its transmission power is set at a predetermined value in accordance with a control signal, comprising:

a modulating circuit for modulating a baseband signal with a carrier signal and variably amplifying and outputting the modulated signal in accordance with a power control signal;

a carrier generating circuit including a local variable amplifier for generating and amplifying the carrier signal with changeable gain; and a carrier control circuit including reference voltage generating means for generating a reference voltage, a comparator for comparing the level of said power control signal with said reference voltage, and a controller for controlling the gain of said local variable amplifier such that a distortion characteristic of a transmitter output is optimal when said power control signal is higher than said reference voltage and the effect of carrier leak on the transmitter output is suppressed when said power control signal is lower than said reference voltage based on the comparison result of said comparator.

2. The transmitter according to claim 1, wherein said reference voltage generating means generates the reference voltage equal to a level of the power control signal corresponding to transmission power equal to the level of said carrier leak.

3. The transmitter according to claim 1, wherein said comparator has a hysteresis characteristics in the determination of whether the level of the power control signal is higher or lower than said reference voltage.

4. The transmitter according to claim 2, wherein said reference voltage is changeable.

5. The transmitter according to claim 1, further comprising power control signal generating means for analyzing a direction from a base station, and generating and outputting said power control signal.

6. A transmitter wherein its transmission power is set at a predetermined value in accordance with a control signal, comprising:
- a modulating circuit for modulating a baseband signal with a carrier signal and variably amplifying and outputting the modulated signal in accordance with a power control signal;
- a carrier generating circuit including a local variable amplifier for generating and amplifying the carrier signal with changeable gain; and
- a carrier control circuit including a reference value register for storing and outputting a reference code corresponding to a reference voltage, a comparator for comparing a power control code with said reference code, and a controller for controlling the gain of said local variable amplifier such that a distortion characteristic of a transmitter output is optimal when said power control code is higher than said reference code and the effect of carrier leak on the transmitter output is suppressed when said power control code is lower than said reference code based on the comparison result of said comparator.

7. The transmitter according to claim 6, wherein said reference value register generates the reference code equal to a control code corresponding to transmission power equal to the level of said carrier leak.

8. The transmitter according to claim 6, wherein said comparator has a hysteresis characteristics in the determination of whether the level of the power control code is higher or lower than said reference code.

9. The transmitter according to claim 6, wherein said reference value register changes and outputs said reference code.

10. The transmitter according to claim 6, further comprising power control code generating means for analyzing a direction from a base station, generating and supplying said power control code to said comparator, and digital/analog converting said power control code and outputting the converted power control code to said modulating circuit as the power control signal.

11. The transmitter according to claim 10, wherein said power control code generating means can set the reference code in said reference value register.

* * * * *